(12) United States Patent
Lee

(10) Patent No.: US 7,590,428 B2
(45) Date of Patent: Sep. 15, 2009

(54) HINGE UNIT AND MOBILE TERMINAL HAVING THE HINGE UNIT

(75) Inventor: Choong-Jae Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 672 days.

(21) Appl. No.: 11/243,996

(22) Filed: Oct. 6, 2005

(65) Prior Publication Data

US 2006/0084466 A1      Apr. 20, 2006

(30) Foreign Application Priority Data

Oct. 8, 2004    (KR) .................. 10-2004-0080566

(51) Int. Cl.
*H04M 1/00* (2006.01)
(52) U.S. Cl. .................. 455/550.1; 455/575.1
(58) Field of Classification Search .............. 455/550.1, 455/575.1
See application file for complete search history.

(56) References Cited

U.S. PATENT DOCUMENTS

2001/0016474 A1    8/2001  Nagashima
2003/0115718 A1    6/2003  Bechthold
2004/0007409 A1    1/2004  Keller et al.
2004/0166890 A1    8/2004  Gordecki
2005/0119023 A1    6/2005  Sudo et al.

FOREIGN PATENT DOCUMENTS

| CN | 1236249 A | 11/1999 |
|---|---|---|
| GB | 2 337 299 A | 11/1999 |
| JP | 57-181878 A | 11/1982 |
| JP | 5-26227 A | 2/1993 |
| JP | 9-284165 A | 10/1997 |
| JP | 2000-185 A | 1/2000 |
| JP | 2001-297576 A | 10/2001 |
| JP | 2002-139018 A | 5/2002 |
| JP | 2004-132407 A | 4/2004 |

OTHER PUBLICATIONS

English Language revision of Search Report.
Russian Office Action.

*Primary Examiner*—Yuwen Pan
(74) *Attorney, Agent, or Firm*—Birch, Stewart, Kolasch & Birch, LLP

(57) ABSTRACT

A mobile terminal including a main body, a folder body rotatably connected with the main body, a hinge connection part rotatably connecting the main body and the folder body, and a hinge unit mounted at the hinge connection part and configured to variably control a torque applied to the folder body when the folder body is opened and closed.

11 Claims, 6 Drawing Sheets

HINGE UNIT AND MOBILE TERMINAL HAVING THE HINGE UNIT

CROSS-REFERENCE TO A RELATED APPLICATION

This application claims priority to Korean Patent Application No. 10-2004-0080566 filed in Korea on Oct. 8, 2004, the entire contents of which is hereby incorporated in its entirety.

BACKGROUND OF THE INVENTION

1. Field of the Invention

The present invention relates to a mobile terminal, and more particularly, to a hinge unit capable of suitably adjusting a force required for a user to open and close a mobile phone body.

2. Description of the Related Art

FIGS. 1-3 illustrate different views of a mobile terminal and corresponding hinge unit of the related art. As shown in FIG. 1, the related art mobile terminal includes a main body 110 having various circuit components therein and a folder body 120 having a Liquid Crystal Display (LCD) 116 for displaying information to a user. The main body 110 includes a key pad 102 on its front surface to allow a user to input information, and a battery 106 mounted on its rear surface. Further, the folder body 120 is rotatably connected with the main body 110 via hinge connection parts 112 and 114 formed between the main body 110 and folder body 120. In FIG. 1, the hinge connection part 112 is part of the main body 110 and the hinge connection part 114 is part of the folder body 120. The related art mobile terminal also includes a hinge unit 122, which is used to generate a torque whenever the folder body 120 is opened and closed.

As shown in FIGS. 2 and 3, the hinge unit 122 includes a housing 130, which is fixed at the hinge connection part 114. The housing 130 includes an inner space for receiving a moving cam 132. The hinge unit 122 also includes a fixed cam 134 disposed to contact the moving cam 132, a head 136 having the fixed cam 134 mounted thereon and being fixed to the hinge connection part 112, and a spring 138 disposed inside the housing 130. The spring 138 is used to apply a certain elastic force to the moving cam 132.

The operation of the hinge unit 122 of the related art mobile terminal will now be described.

When the folder body 120 is opened or closed, the housing 130 fixed at the hinge connection part 114 of the folder body 120 and the head 136 fixed at the hinge connection part 112 of the main body 110 are rotated relative to the movement of the folder body 120. Thus, the fixed cam 134 fixed at the head 136 is rotated along the moving cam 132, to thereby linearly move the moving cam 132. At this time, the spring 138 supported by the moving cam 132 is compressed to apply an elastic force to the moving cam 132 to generate torque when the folder body 120 is opened and closed.

However, because the spring 138 of the hinge unit has a uniform elastic force, the spring 138 produces the same torque when the folder body 120 is opened and closed. That is, the user must use the same amount of force to open or close the folder body 120.

BRIEF DESCRIPTION OF THE INVENTION

Accordingly, an object of the present invention is to at least address the above-noted and other problems.

Another object of the present invention is to provide a novel mobile terminal that allows a user to control a force required for opening and closing the folder body.

To achieve these and other advantages and in accordance with the purpose of the present invention, as embodied and broadly described herein, the present invention provides a novel mobile terminal including a main body, a folder body rotatably connected with the main body, a hinge connection part rotatably connecting the main body and the folder body, and a hinge unit mounted at the hinge connection part and configured to variably control a torque applied to the folder body when the folder body is opened and closed.

Further, the hinge unit preferably includes a housing having an inner space with both ends opened, a moving cam configured to be linearly moved in the inner space of the housing, a fixed cam rotatably disposed inside the housing and configured to contact the moving cam, a head having the fixed cam mounted thereon, a spring configured to apply an elastic force to the moving cam, and a torque controller configured to control the torque required to open and close the folder body by varying a tensile force of the spring applied to the moving cam.

The torque controller also preferably includes a support plate configured to be linearly moved inside the housing and to support one end of the spring, and a control bolt mounted at the support plate and configured to linearly move the support plate based on a user's operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

A mobile terminal according to a preferred embodiment of the present invention will now be described with reference to the accompanying drawings.

Figure 1:
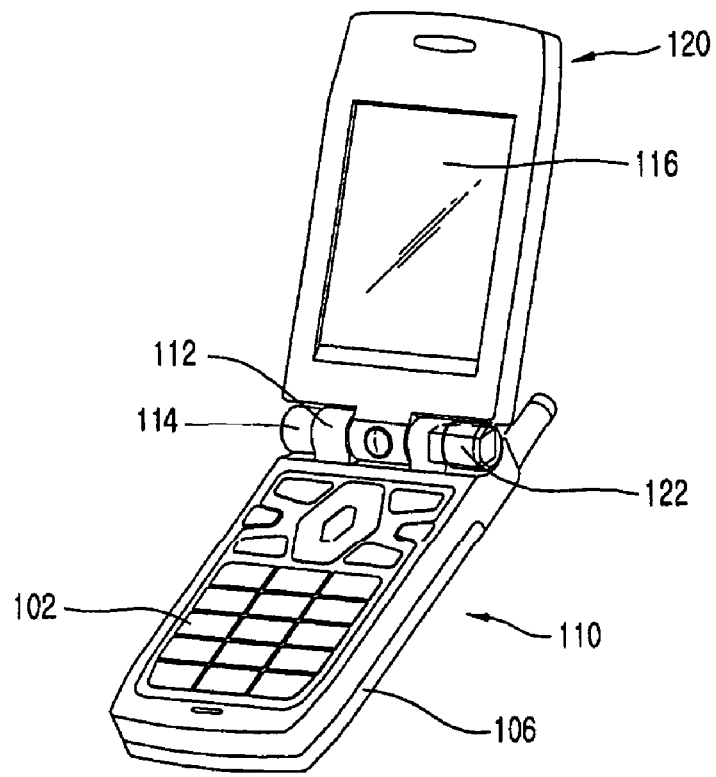
FIG. 1 is a perspective view of the mobile terminal according to the related art.
Figure 2:
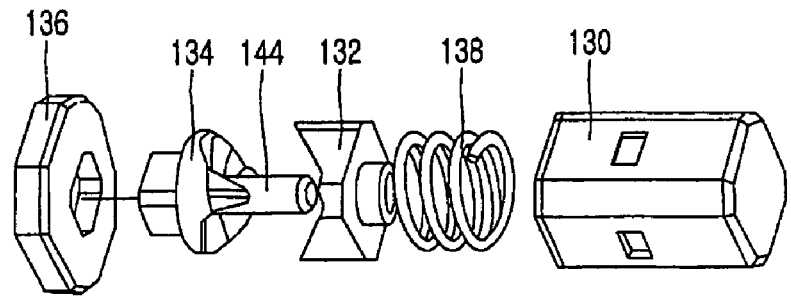
FIG. 2 is an exploded perspective view of a hinge unit of the mobile terminal shown in FIG. 1.
Figure 3:
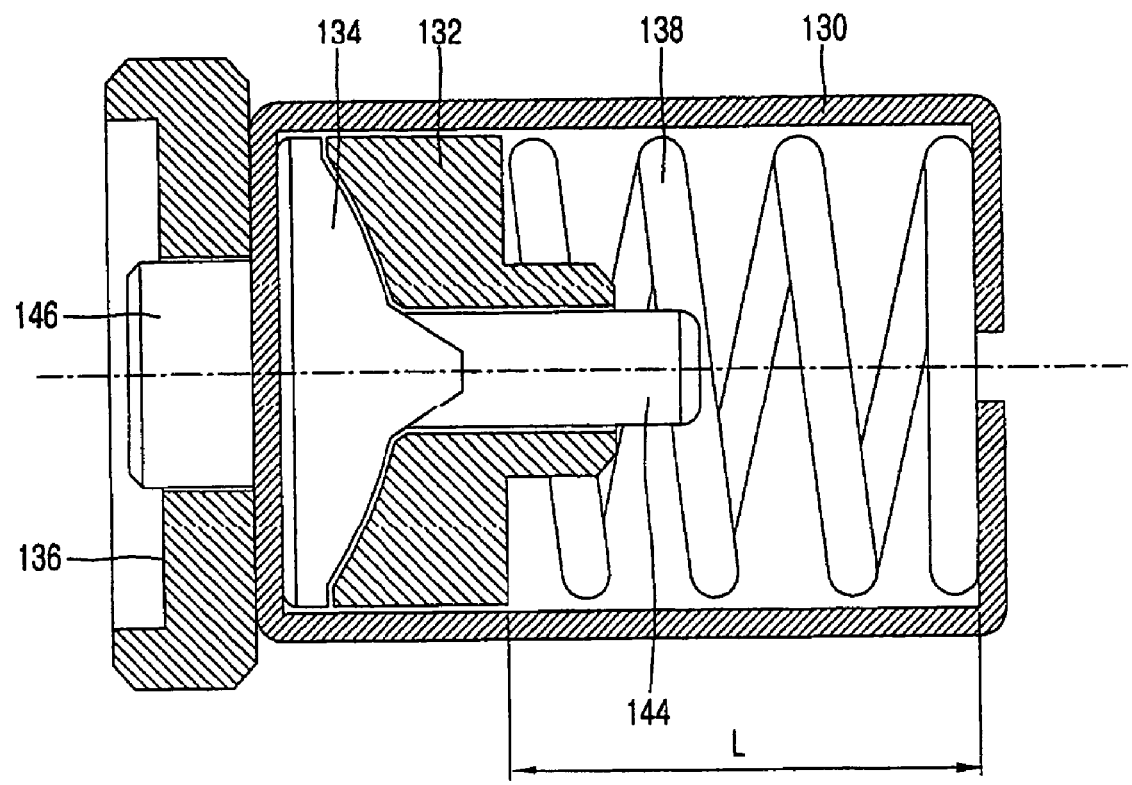
FIG. 3 is a sectional view of the hinge unit shown in FIG. 2.
Figure 4:
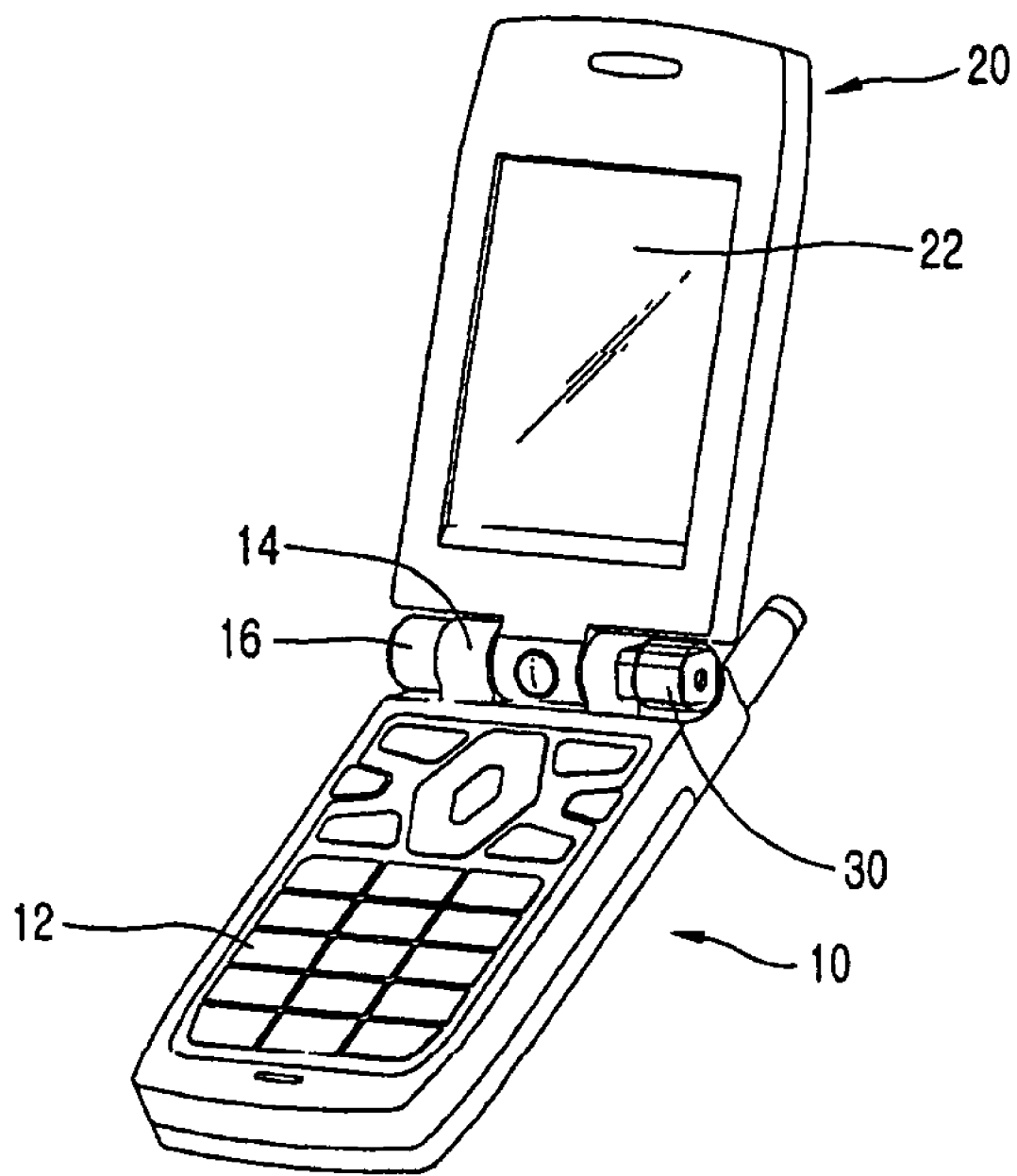
FIG. 4 is a perspective view of a mobile terminal according to the present invention.

FIG. 4 is a perspective view of a mobile terminal according to the present invention. As shown, the mobile terminal includes a main body 10 having a printed circuit board with various circuit components mounted thereon and a key pad 102 on its front surface to allow a user to input information.

The mobile terminal also includes a folder body 20 rotatably connected with the main body 10. As shown, the folder body 20 includes, for example, a liquid crystal display (LCD) 22 for displaying information to the user.

The mobile terminal also includes hinge connection parts 14 and 16 rotatably connecting the main body 10 and the folder body 20, and a hinge unit 30 installed at the hinge connection parts 14 and 16. The hinge unit 30 generates a torque when the folder body 20 is opened and closed, and also includes an adjustment feature allowing the user to control the amount of torque used for opening and closing the folder body 20.

Figure 5:
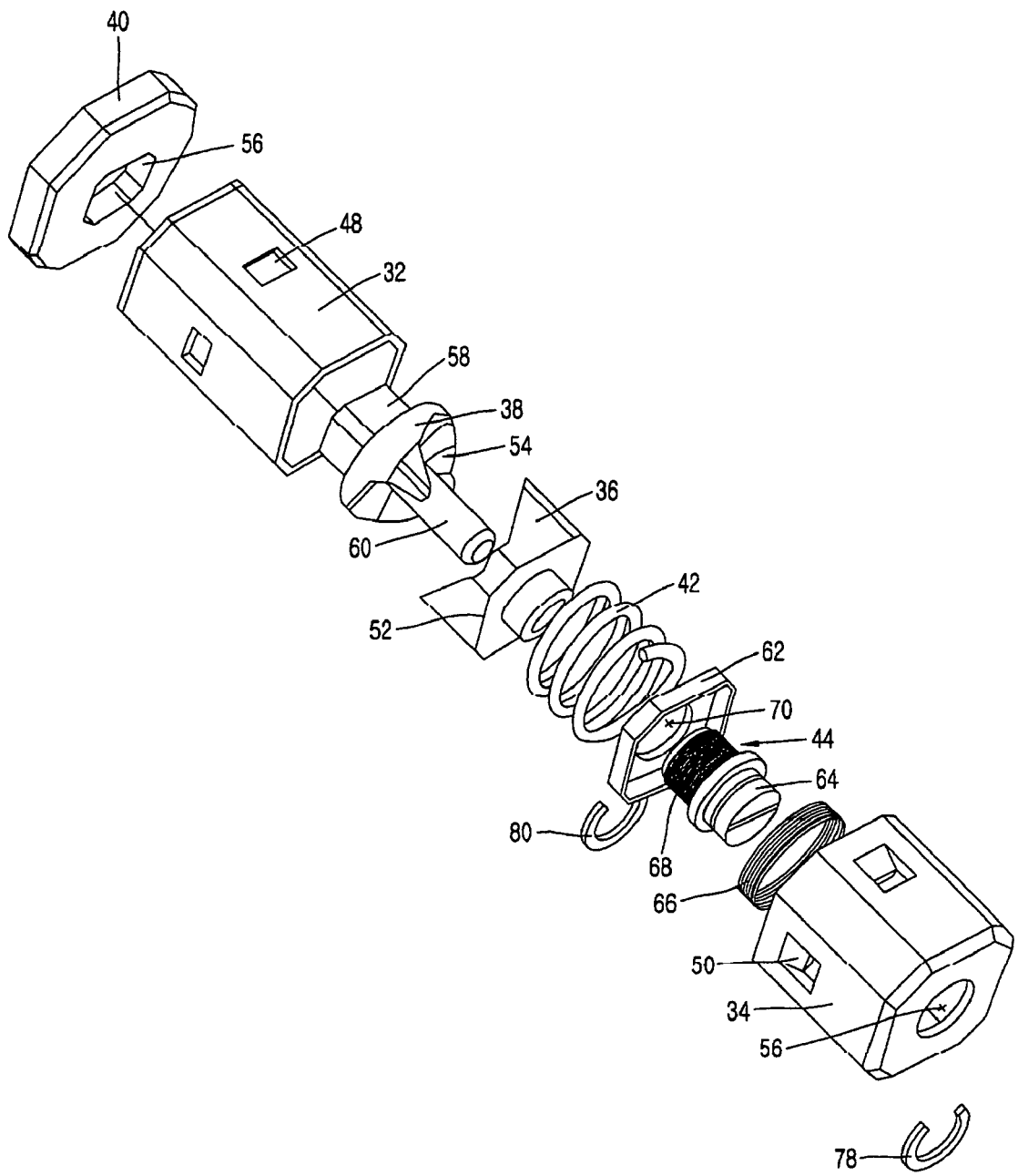
FIG. 5 is an exploded perspective view of the mobile terminal according to the present invention.
Figure 6:
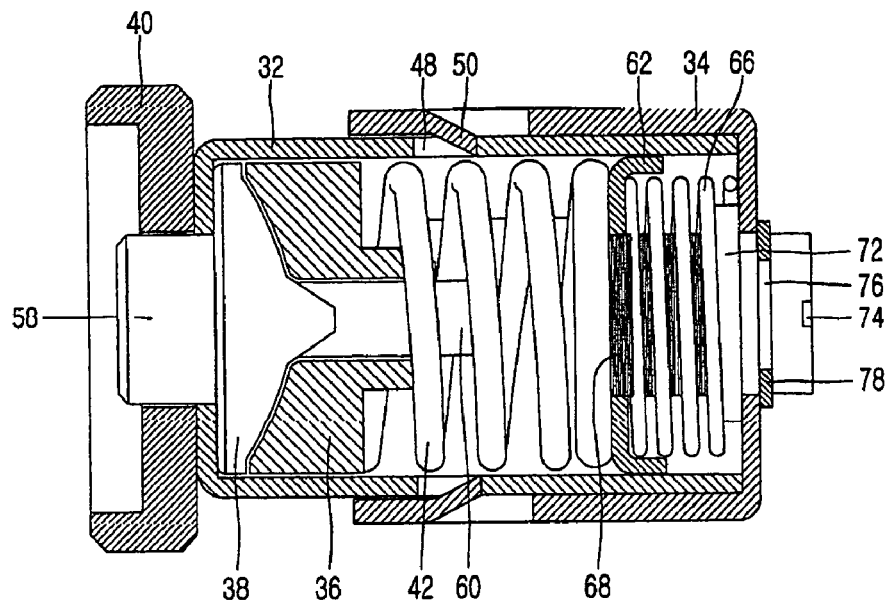
FIG. 6 is a sectional view of the hinge unit according to the present invention.

Turning next to FIGS. 5 and 6, which illustrate different views of the hinge unit 30. As shown in FIG. 5, the hinge unit 30 includes a housing 32 fixed at one of the hinge connection parts 14 and 16. Further, the housing 32 includes an inner space for receiving a moving cam 36 that moves linearly within the housing 32. The hinge unit 30 also includes a fixed cam 38 rotatably disposed inside the housing 32 and being disposed to contact the moving cam 36, a head 40 having the fixed cam 38 mounted thereon and fixed to the other remaining one of the hinge connection parts 14 and 16, a spring 42 disposed inside the housing 32 and applying an elastic force to the moving cam 36, and a torque controller 44 mounted inside the housing 32 and controlling a torque when the folder body 20 is opened and closed. Further, as discussed in more detail below, the tensile force of the spring 42 applied to the moving cam 36 may be adjusted by the user.

In addition, the housing 32 preferably has a polygonal shape with both ends opened, and in which a cover 34 is placed over one end of the housing 32 (FIG. 6 illustrates the cover 34 secured over one end of the housing 32). The cover 34 includes a through-hole 56 through which the torque controller 44 is exposed and includes stopping hooks 50 which are associated with stopping holes 48 on the housing 32. In more detail, the stopping hooks 50 are formed in a circumferential direction of the cover 34 and are bent inwards so as to be caught by the stopping holes 48. Thus, when the cover 34 is placed over the housing 32, the stopping hooks 50 and stopping holes 48 engage with each other to lock the housing 32 and the cover 34.

Further, when the housing 32 is fixed at the hinge connection part 16 of the folder body 20, the head 40 is fixed to the hinge connection part 14 of the main body 10. Alternatively, when the housing 32 is fixed at the hinge connection unit 14 of the main body 10, the head 40 is fixed to the hinge connection part 16 of the folder body.

In addition, as discussed above, the moving cam 36 moves linearly within the housing 32. Also, the moving cam 36 has an outer circumference shape that matches the polygonal shape of the housing 32 so the moving cam 36 does not rotate within the housing 32. One end of the moving cam 36 includes a first cam face 52 for engaging with a second cam face 54 of the fixed cam 38 and the other end of the moving cam 36 supports one end portion of the spring 42.

In addition, the fixed cam 38 has a circular outer circumference so it can be rotatably disposed inside the housing 32. Thus, the second cam face 54 contacts the first cam face 52 of the moving cam 36 causing the moving cam 36 to move linearly within the housing 32. Further, the fixed cam 38 includes a fixing part 58 that is inserted into a fixing hole 56 of the head 40, and includes a cam shaft 60 formed in a longitudinal direction thereof. The moving cam 36 thus moves linearly along the cam shaft 60.

In addition, the torque controller 44 includes a support plate 62 having a same polygonal outer circumference as an inner circumference of the housing 32 such that the support plate 62 can move linearly within the housing 32. The support plate 62 also supports the other end the spring 42. Further, a control bolt 64 includes threads on one end that match a threaded portion 70 of the support plate 62. The other end of the control bolt 64 is exposed through the through hole 56 of the cover 34. A support spring 66 is also installed between inner wall faces of the support plate 62 and the housing 32 and is used to prevent the support plate 62 from being inclined when the support plate 62 is moved.

Further, as shown, one side of the support plate 62 supports the spring 42 and the other side supports the support spring 66, such that when the control bolt 64 is rotated, the support plate is linearly moved within the housing 32 to control a tensile force of the spring 42.

Figure 7:
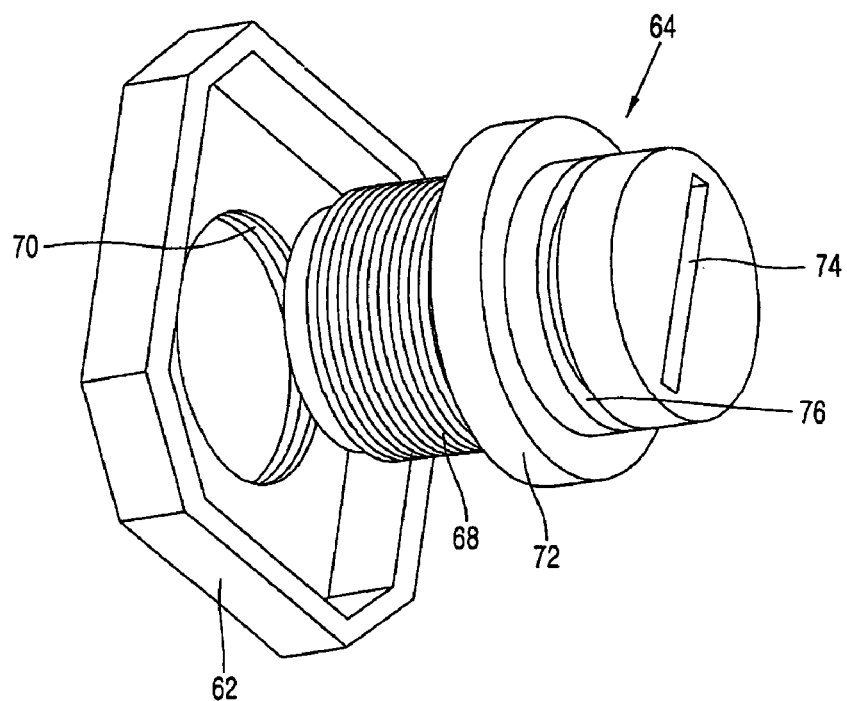
FIG. 7 is a perspective view of a control bolt of the hinge unit according to the present invention.

FIG. 7 illustrates in detail the threads 68 of the control bolt 64 to be threaded with the threaded portion 70 of the support plate 62. FIG. 7 also illustrates a tool insertion hole 74 into which a tool can be inserted to rotate the control bolt 64. In an alternative example, rather than using the tool insertion hole 74, a user may simply turn the control bolt 64 by hand. Further, the control bolt 64 is rotatably mounted at the through hole 70 of the support plate 62 but its linear movement is prevented. Namely, the control bolt 64 includes a support part 72 extending in an outward direction to prevent linear movement of the control bolt 64.

Also, the control bolt 64 includes a groove 76 formed in a circumferential direction at a portion positioned at an outer surface of the cover 34, in which a snap ring 78 is mounted. FIG. 6 illustrates the snap ring 78 mounted into the groove 76. Thus, because the support part 72 is supported by an inner side of the cover 34 and is secured via the snap ring 78 at the outer side of the cover 34, the control bolt 64 can make a rotational movement but not a linear movement. Further, the snap ring 80 is mounted at the end portion of the control bolt 64 to prevent the control bolt 64 from being released from the support plate 62.

In addition, because one end of the support spring 66 is supported by the support plate 62 and the other end is supported by the inside of the cover 34, a certain amount of elastic force is applied to the support plate 62 to thereby prevent the support plate 62 from inclining or becoming distorted when the support plate 62 is linearly moved.

The operation of the mobile terminal constructed as described above will now be explained with reference to FIGS. 8 and 9.

Figure 8:
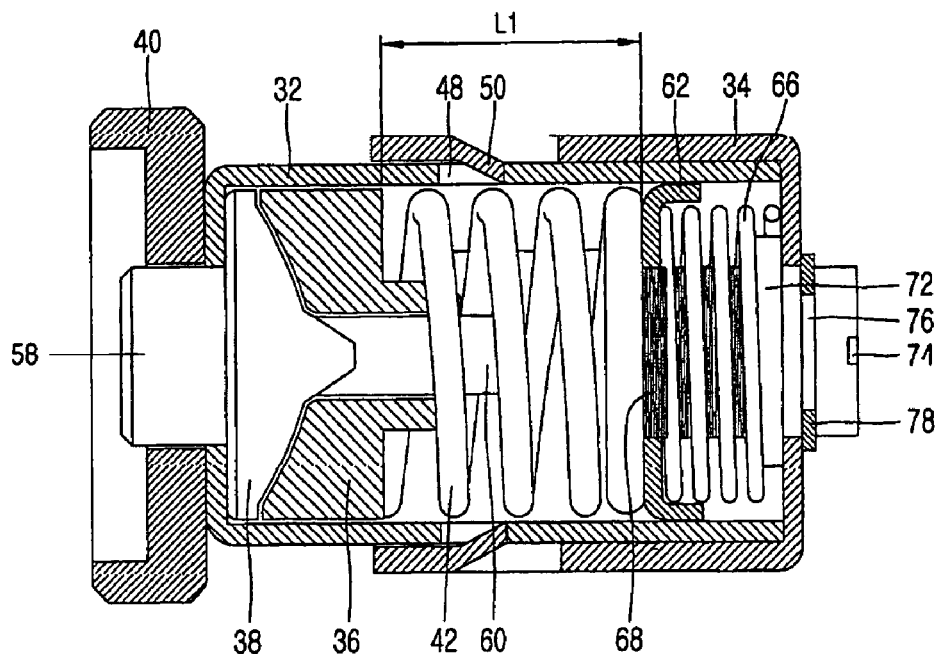
FIGS. 8 and 9 show operational states of the hinge unit according to the present invention.
Figure 9:
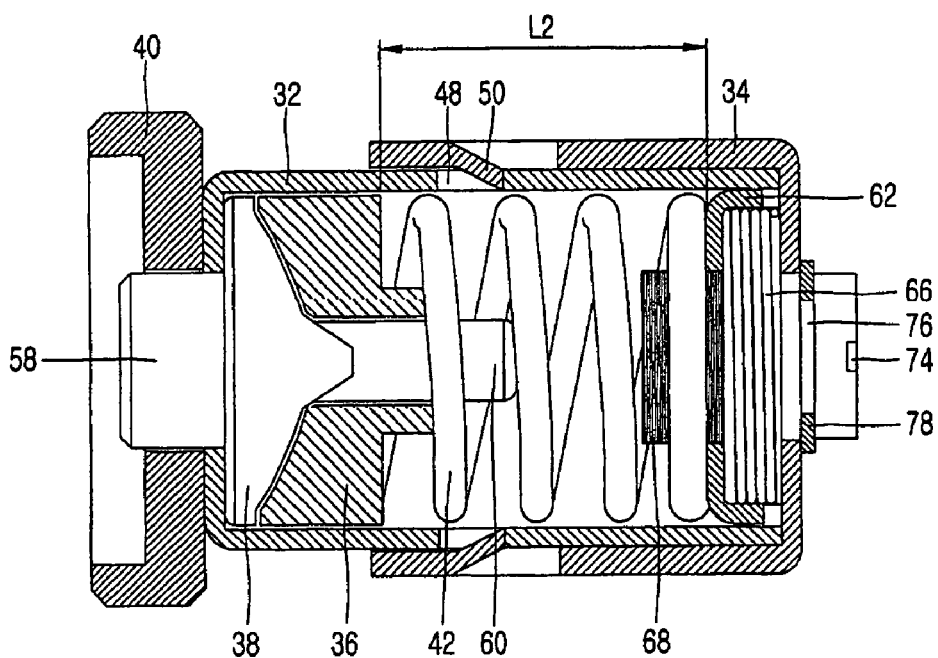

When the user rotates the control bolt 64 clockwise using a tool inserted into the insertion hole 74, the support plate 62 threaded with the control bolt 64 is linearly moved in a forward direction, which shortens the length (L1) of a free field of the spring 42 (FIG. 8). Accordingly, the tensile force of the spring 42 also increases. Conversely, if the user rotates the control bolt 64 counterclockwise, the support plate 62 threaded with the control bolt 64 is linearly moved in a backward direction. Thus, a length (L2) of the free field of the spring 42 is lengthened and the tensile force of the spring 42 is reduced (FIG. 9).

In this manner, the user can vary the tensile force of the spring 42 by rotating the control bolt 64 clockwise or counterclockwise. Accordingly, the force working between the first cam face 52 of the moving cam 36 and the second cam face 54 of the fixed cam 38 changes, so the user can control the force required for opening and closing the folder body.

As so far described, the mobile terminal according to the present invention is advantageous because the user can control the amount of force required to open and close and the folder body. Thus, the user can conveniently use the mobile phone.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
a main body;
a folder body rotatably connected with the main body;
a hinge connection part rotatably connecting the main body and the folder body; and
a hinge unit mounted at the hinge connection part and configured to variably control a torque applied to the folder body when the folder body is opened and closed,
wherein the hinge unit comprises:
a housing having an inner space with both ends opened;
a moving cam configured to be linearly moved in the inner space of the housing;
a fixed cam rotatably disposed inside the housing and configured to contact the moving cam;
a head having the fixed cam mounted thereon;
a spring configured to apply an elastic force to the moving cam; and
a torque controller configured to control the torque required to open and close the folder body by varying a tensile force of the spring applied to the moving cam,
wherein the torque controller comprises:
a support plate configured to be linearly moved inside the housing and to support one end of the spring; and
a control bolt mounted at the support plate and configured to linearly move the support plate based on a user's operation, and
wherein the support plate includes a through hole for receiving one end of the control bolt such that a portion of the one end of the control bolt is exposed to an outside of the cover, and the control bolt includes a tool insertion hole at the exposed portion of the control bolt configured to receive a tool to turn the control bolt clockwise or counter clockwise.

2. The mobile terminal of claim 1, further comprising:
a cover having a through hole through which the torque controller is exposed, wherein the cover is mounted at one end of the housing.

3. The mobile terminal of claim 2, further comprising:
stopping holes formed on an outer circumference of the housing; and
stopping hooks formed on an outer circumference of the cover and configured to engage the stopping holes.

4. The mobile terminal of claim 1, wherein the support plate has an outer circumference that substantially matches and inner circumference of the housing.

5. The mobile terminal of claim 1, wherein the support plate has a female threaded portion configured to engage male threads of the control bolt.

6. The mobile terminal of claim 1, further comprising: a support spring disposed between inner surfaces of the support plate and the housing and configured to provide an elastic force to the support plate.

7. The mobile terminal of claim 1, wherein the control bolt is mounted to the cover such that the control bolt can make a rotational movement but cannot make a linear movement.

8. The mobile terminal of claim 7, wherein the control bolt includes a support formed at an outer circumference and a groove at the exposed portion to receive a snap ring, said support configured to contact an inner surface of the cover.

9. The mobile terminal of claim 8, wherein the snap ring prevents the control bolt from being released from the support plate.

10. The mobile terminal of claim 1, wherein the torque applied by the hinge unit is manually adjusted by a user of the mobile terminal.

11. The mobile terminal of claim 1, wherein the hinge unit includes a tool accommodating feature for interacting with a tool to set the torque applied by the hinge unit.

* * * * *